United States Patent
Sacks et al.

(10) Patent No.: US 7,383,188 B2
(45) Date of Patent: Jun. 3, 2008

(54) OBJECT LOADING SYSTEM AND METHOD

(75) Inventors: Jerry Dennis Sacks, Houston, TX (US); James Michael Parks, Richmond, TX (US); Kenneth Ray Vestal, Houston, TX (US)

(73) Assignee: Systems Application Engineering, Inc., Houston, TX (US)

( * ) Notice: Subject to any disclaimer, the term of this patent is extended or adjusted under 35 U.S.C. 154(b) by 79 days.

(21) Appl. No.: 11/595,406

(22) Filed: Nov. 9, 2006

(65) Prior Publication Data

US 2007/0083443 A1 Apr. 12, 2007

Related U.S. Application Data

(63) Continuation-in-part of application No. 10/736,107, filed on Dec. 15, 2003, now Pat. No. 7,171,363.

(60) Provisional application No. 60/435,993, filed on Dec. 23, 2002.

(51) Int. Cl.
*G10L 15/00* (2006.01)
*G06K 9/22* (2006.01)

(52) U.S. Cl. .............. 704/270; 704/275; 235/462.14; 235/462.45; 715/728

(58) Field of Classification Search ............. 704/270, 704/275; 235/462.14, 462.45; 715/728
See application file for complete search history.

(56) References Cited

U.S. PATENT DOCUMENTS

| | | | |
|---|---|---|---|
| 4,916,441 A * | 4/1990 | Gombrich | 345/169 |
| 4,931,950 A | 6/1990 | Isle et al. | |
| 5,144,120 A * | 9/1992 | Krichever et al. | 235/462.35 |
| 5,208,745 A | 5/1993 | Quentin et al. | |
| 5,928,292 A | 7/1999 | Miller et al. | |
| 6,323,452 B1 * | 11/2001 | Bonnet | 209/583 |
| 6,496,806 B1 | 12/2002 | Horwitz et al. | |
| 6,600,418 B2 * | 7/2003 | Francis et al. | 340/572.1 |
| 6,671,646 B2 | 12/2003 | Manegold et al. | |
| 7,171,363 B2 * | 1/2007 | Sacks et al. | 704/270 |
| 2003/0020629 A1 | 1/2003 | Swartz et al. | |
| 2003/0173174 A1 | 9/2003 | Stephan et al. | |
| 2004/0202154 A1 | 10/2004 | Aklepi et al. | |

* cited by examiner

*Primary Examiner*—Daniel D Abebe
(74) *Attorney, Agent, or Firm*—Buskop Law Group, PC; Wendy Buskop

(57) ABSTRACT

The invention is a method for objects selection at a location comprising the steps of using a mobile computer having a bar code reader, a display, an audio output device, an audio input device, a tactile input device, text to speech software, a voice recognition software, objects selection applications software, and radio frequency identification (RFID) reader, wherein said mobile computer is adapted for communication between an order systems server and a user and the order systems server is adapted for communication between the mobile computer and at least one external computer system.

9 Claims, 14 Drawing Sheets

```
              310
               |
       ┌──────────────────────┐
       │   LOAD 2103 SUMMARY  │
       │ Status:         Open │──────── 312
       │ Qty Planned:      25 │──────── 314
       │ Qty Pending:      23 │──────── 316
       │ Qty Avail:         0 │──────── 318
       │ Qty Omitted:       0 │──────── 320
       │ Qty Loaded:        2 │──────── 322
       │ ENTER to Continue    │
       └──────────────────────┘
      /
   324
```

Figure 21

```
       ┌──────────────────────┐
       │   REQUEST OBJECTS    │
       │    AVAILABLE LIST    │
       │  Scan Object or Enter│
       │       Load ID        │
       │     ^_____       │──────── 350
       │                      │
  352──┼──CLEAR to Cancel     │
       │  ENTER for Load 1234 │──────── 354
       └──────────────────────┘
```

OBJECT LOADING SYSTEM AND METHOD

CROSS-REFERENCE TO RELATED APPLICATIONS

This application is a continuation-in-part application of prior U.S. patent application Ser. No. 10/736,107, filed Dec. 15, 2003 now U.S. Pat. No. 7,171,363, which claimed the benefit to a provisional U.S. patent Application Ser. No. 60/435,993, filed Dec. 23, 2002, which is incorporated by reference herein.

FIELD OF THE INVENTION

The present invention relates to a method and system for loading an object at a warehouse onto a transport vehicle, such as a truck.

BACKGROUND OF THE INVENTION

Current methods for loading objects onto a transport vehicle are slow and subject to error. Loaders tend to make numerous mistakes. The most costly mistakes are not locating the correct object to load onto the transport vehicle and not identifying the location an object was placed on the transport vehicle. Other errors include loading the objects onto the transport vehicle in the wrong sequence and loading the transport vehicle too slowly.

A need has existed to overcome the above problems, efficiently and economically.

BRIEF DESCRIPTION OF THE DRAWINGS diagram of the steps involved in the method of the invention;

FIG. 21 is the load summary display;

FIG. 22 is the objects available display;

Figure 1:
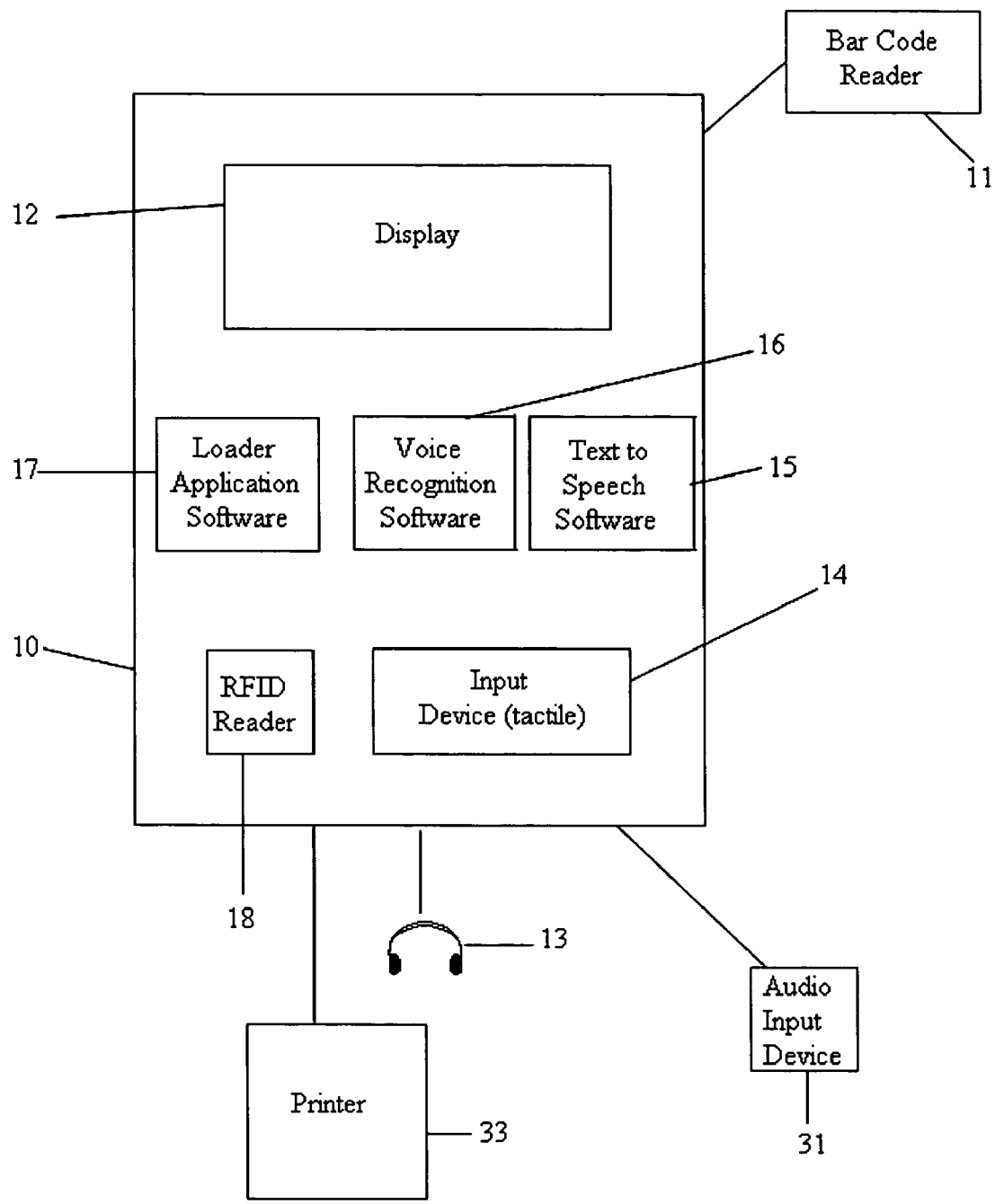
FIG. 1 is a diagram of an overview of the system for use by the method of the invention.

The present invention is detailed below with reference to the at least one source transport device.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention will become more fully understood from the detailed description given herein below. However, the following description is for purposes of illustration only, and thus is not limitative of the invention.

The invention relates to a method for loading an object on a transport vehicle. An alternative embodiment of the method for loading an object on a transport vehicle can involve using a mobile computer. The mobile computer can have a bar code reader, a display, an audio output device, an audio input device, a tactile input device, text-to-speech software, a voice recognition software, loader applications software, a printer and radio frequency identification (RFID) reader wherein the mobile computer is adapted for communication between an loader server system and a user and the loader server system is adapted for communication between the mobile computer and at least one external computer system.

The alternative embodiment of the method for loading an object on a transport vehicle can also include entering a user code to log onto the mobile computer; training the voice recognition software by the user; providing instructions to the user from the loader applications software using the text-to-speech software to the audio input device and the audio output device, and providing information from the loader applications software to the display.

The alternative embodiment of the method can also include transmitting a request from the mobile computer to the loader server system to obtain a list of objects to be loaded. The alternative embodiment of the method can further include using the applications software to generate a summary of the objects to be loaded from the list; displaying the summary of the objects to be loaded on the display; providing the summary of the objects to be loaded using via the text-to-speech software to the audio output device; performing a step which is a member of the group: acknowledging the summary of objects to be loaded by the user using the tactile input device and acknowledging the summary of objects to be loaded using the audio input device; identifying an object to determine if the object is to be loaded.

The object to be loaded can be identified by one of the following steps:

speaking the characters identifying the object into the audio input device;

scanning a barcode on the object;

scanning a barcode on the object;

reading a RFID data on the object;

Advising the user with the text-to-speech software the object can be loaded can be include one of the following: the object is not loadable; the object is out of sequence for the load; or the object is for a different load.

Acknowledging the object has been loaded can include one of the following: providing an acknowledgement using the voice recognition software; bar code scanning a transport vehicle; bar code scanning the location of the transport vehicle; reading an RFID tag for a transport vehicle; and reading an RFID tag for the location of the transport vehicle.

An embodiment of the method can include repeating the steps of the method all objects have been loaded.

The alternative embodiment of the method can also include providing an acknowledgement to the loader server system the results of the process steps performed; and transferring the results from the loader server system to the at least one external computer system.

It is contemplated that in one embodiment of the method in the acknowledgement word is "ready".

Another embodiment of the method can further the step of using the mobile computer to obtain status information for the user that is an indication of the user's performances compared to the expected completion time for steps performed.

It is further contemplated that an embodiment of the method can include answers to a series of safety questions are required from the user regarding the transport vehicle into which the objects are being loaded from the group including: are the brakes working; is the horn working; is the steering working; are there any leaks in the transport vehicle; is there any damage to the transport vehicle; are the tires and wheels inflated and undamaged; and combinations thereof.

It is contemplated that an embodiment of the method can include a second user contacting user from a remote location via the loader server system, which communicates with the mobile computer which then provides the communication via audio output device and display at any time during the method.

It is yet further contemplated that in another embodiment of the method that the object is a transport device containing product, is a product, is a piece of equipment.

An embodiment of the method contemplates the step of alerting the user of the object is missing product prior to loading.

The method for loading an object on a transport vehicle is shown in FIG. 1. The method uses a mobile computer (10). The mobile computer has a bar code reader (11), a display (12), an audio output device (13), an audio input device (31), a tactile input device (14), text-to-speech software (15), voice recognition software (16), loader applications software (17), a printer (33) and radio frequency identification (RFID) reader (18). The objects to be loaded can also be a transport device containing product, product, or a piece of equipment.

The mobile computer is a model number MC9090-SHOHJAFA6WW similar device available from Symbol Technologies, Inc. as well as similar mobile or wearable computers manufactured by Intermec Corporation or LXE, Incorporated or others. The bar code scanner can be a scanner that is part of the mobile computer or a wireless scanner like the CRS Series 9, Wireless Bluetooth Ring Scanner available from Socket Communications. The audio input device, or headset is an Intri-Con Resistance Technologies, Product Number SH09-3748 or similar headset available from other headset manufacturers. The voice recognition software can be the Handheld Speech Voice Recognition Software available from Handheld Speech LLC or other similar commercially available speech recognition software available from other such voice software suppliers. The text-to-speech software can be ScanSoft Inc.'s RealSpeak Solo Software or similar text-to-speech software available from other suppliers. A typical wireless Bluetooth communication radio for the mobile computer is an internal Bluetooth radio or a Bluetooth Connection Kit consisting of CompactFlash I/O Bluetooth Card, Type I provided by Socket Communications. The communications network which would enable the mobile computer to communicate to the loader server system in a wireless mode would be the Spectrum24 Wireless Network from Symbol Technologies. These models and manufacturers, as well as products similar in nature, can be used in the preferred embodiment of the invention.

The method for loading an object on a transport vehicle can also use a printer (33), such as a QL320, QL420, QL320 Plus, or QL420 Plus Printer from Zebra Technologies or other similar printers from other printer manufacturers. A holster for the printer is Systems Application Engineering's Soft Pack Printer Holster or SAENT-03. The holsters for the mobile computer may be provided by Agora Leather, Part Number T58190W or others.

Figure 2:
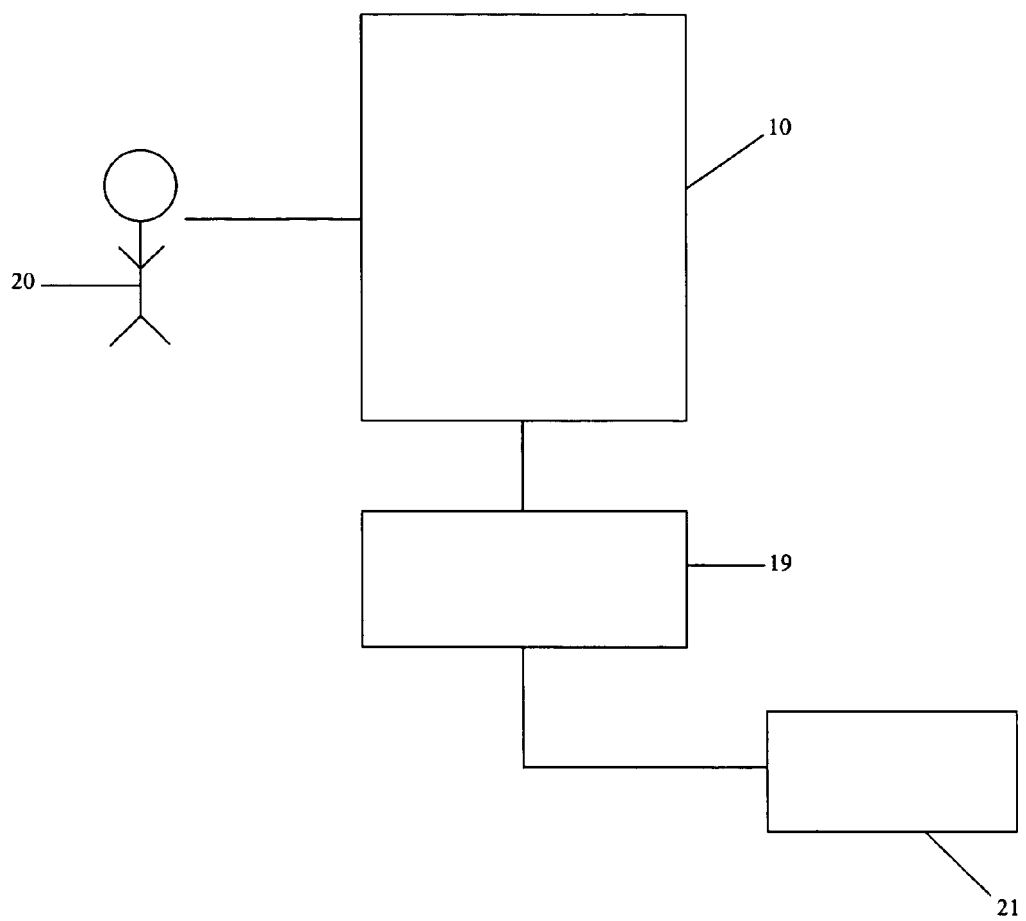
FIG. 2 is a diagram of the mobile computer and accessories used in the inventive method and the software stored thereon.
Figure 3:
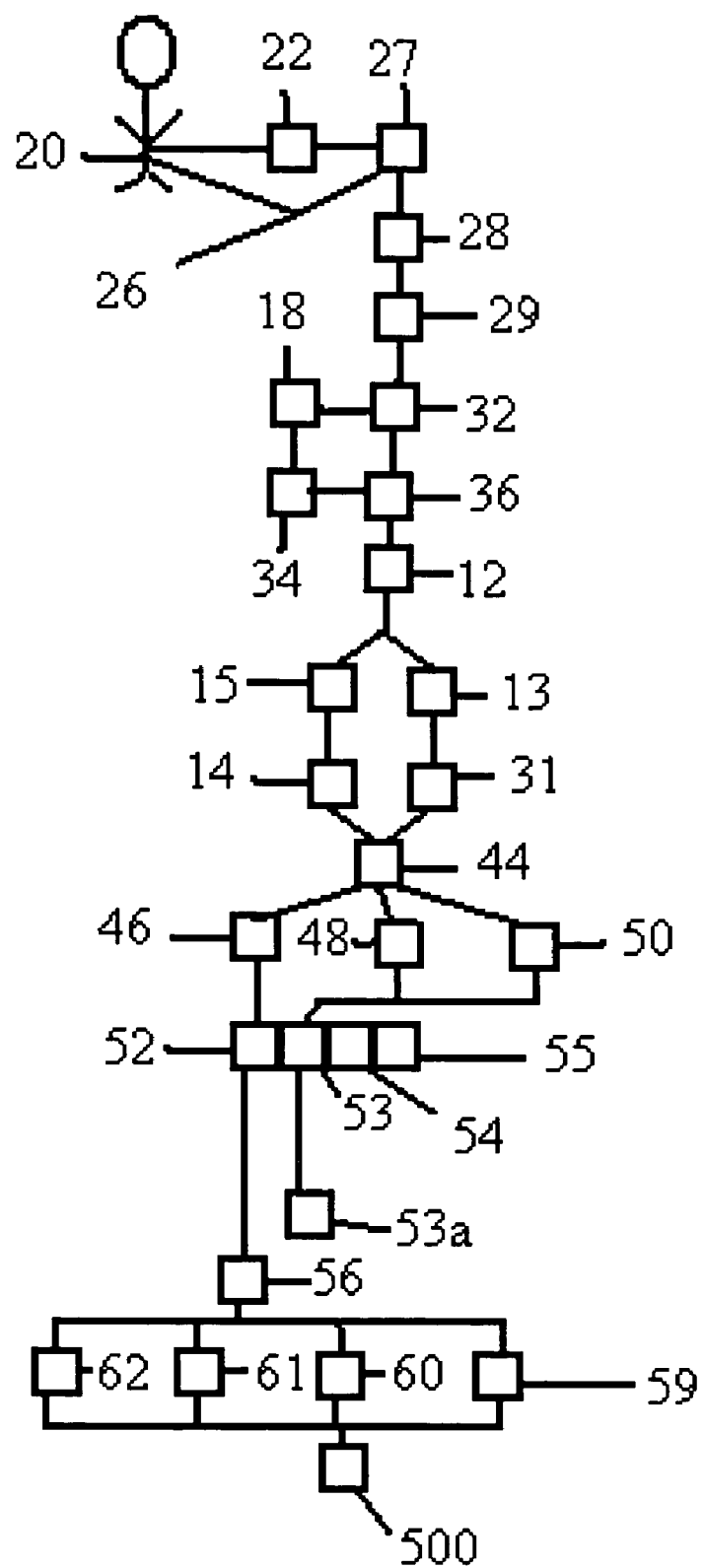
FIG. 3 is a diagram of the steps involved in the method of the invention.

The mobile computer is adapted to facilitate communication between the loader server system (19) and a user (20) as shown in FIG. 2. The loader server system aids in transferring data between the mobile computer and at least one external computer system (21).

The method for loading an object begins by the user, herein also referred to as the loader, entering a user code (22) to log onto the mobile computer and training the voice recognition software to recognize the user's speech. The user (20) provides instructions (26) from the loader applications software (27) then provides information (28) from the loader applications software to the display. The user provides this information by using the text-to-speech software (29).

Next, the user transmits a request (32) from the mobile computer to the loader server system (18) to obtain a list (34) of objects to be loaded. The applications software generates a summary (36) of the objects to be loaded from the list (34) and displays the summary of the objects to be loaded on the display (12). The summary of the objects to be loaded is transmitted via the text-to-speech software (15) to the audio output device (13). The user acknowledges the summary of objects to be loaded using either the tactile input device (14) and or the audio input device (31).

The user identifies the object (44) and determines if the object is to be loaded. The user accomplishes this by speaking the characters identifying the object into the audio input device (46), speaking scanning a barcode on the object (48), or reading the RFID data on the object (50).

After the user identifies the object (44) the text-to-speech software advises the user through the audio output device (31) whether the object can be loaded (52), cannot be loaded (53), is out of the load sequence (54), or the object is for a different load (55). If the object is not to be loaded, the user then attempts to find the correct item to be loaded (53a) using the above method steps. The method can also include the additional the step of alerting the user if the object is missing prior to loading.

When the correct item has been loaded by the user, the user can acknowledge the object (56) has been loaded. The user can provide acknowledgement using the voice recognition software. The user can bar code scan the transport vehicle (59) or can bar code scan the location of the transport vehicle (60). In addition, the user can read the RFID tag for the transport vehicle (61) or read an RFID tag for the location of the transport vehicle (62). The acknowledgement word can be "ready" (500).

Figure 4:
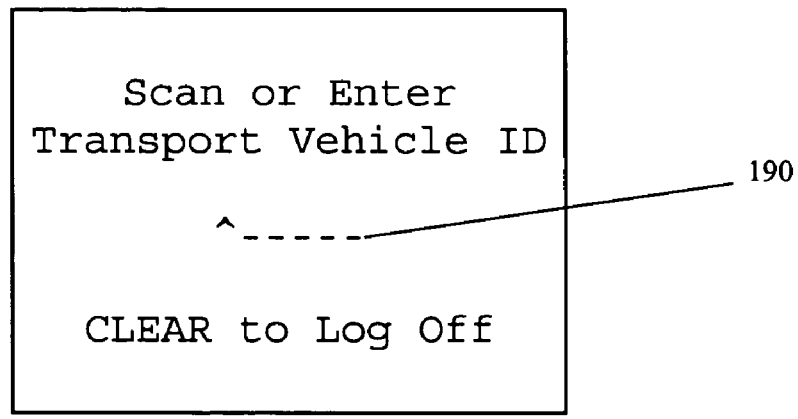
FIG. 4 is the display that is used to identify the transport vehicle.

The method can also involve the user identifying the transport vehicle that moves the transport devices unto the load (190) as shown in FIG. 4 and numerous answers to a series of safety questions.

These safety answers and questions are required from the user regarding the transport vehicle. These safety questions can be one or more of the of the following as shown in FIG. 5: is the horn working? (192); are the brakes working? (194); is the steering working? (196); are the direction controls working? (198); are the tires and wheels inflated and undamaged? (200), is there any damage to the transport vehicle? (201).

Figure 5:
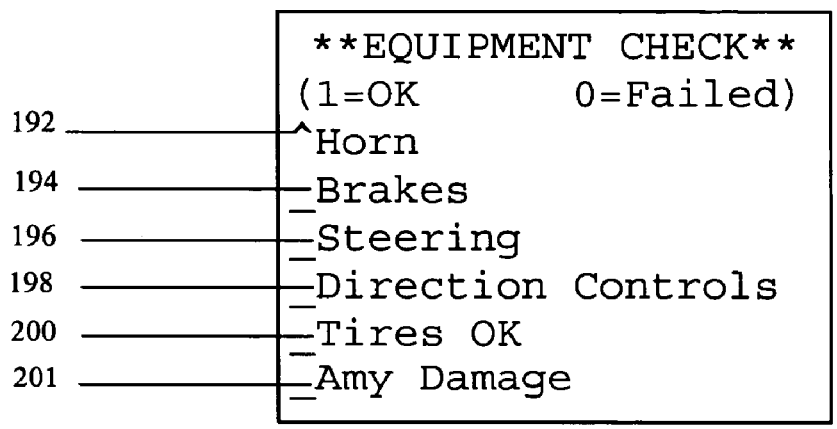
FIG. 5 is the display used to perform the safety checks on the transport vehicle.
Figure 6:
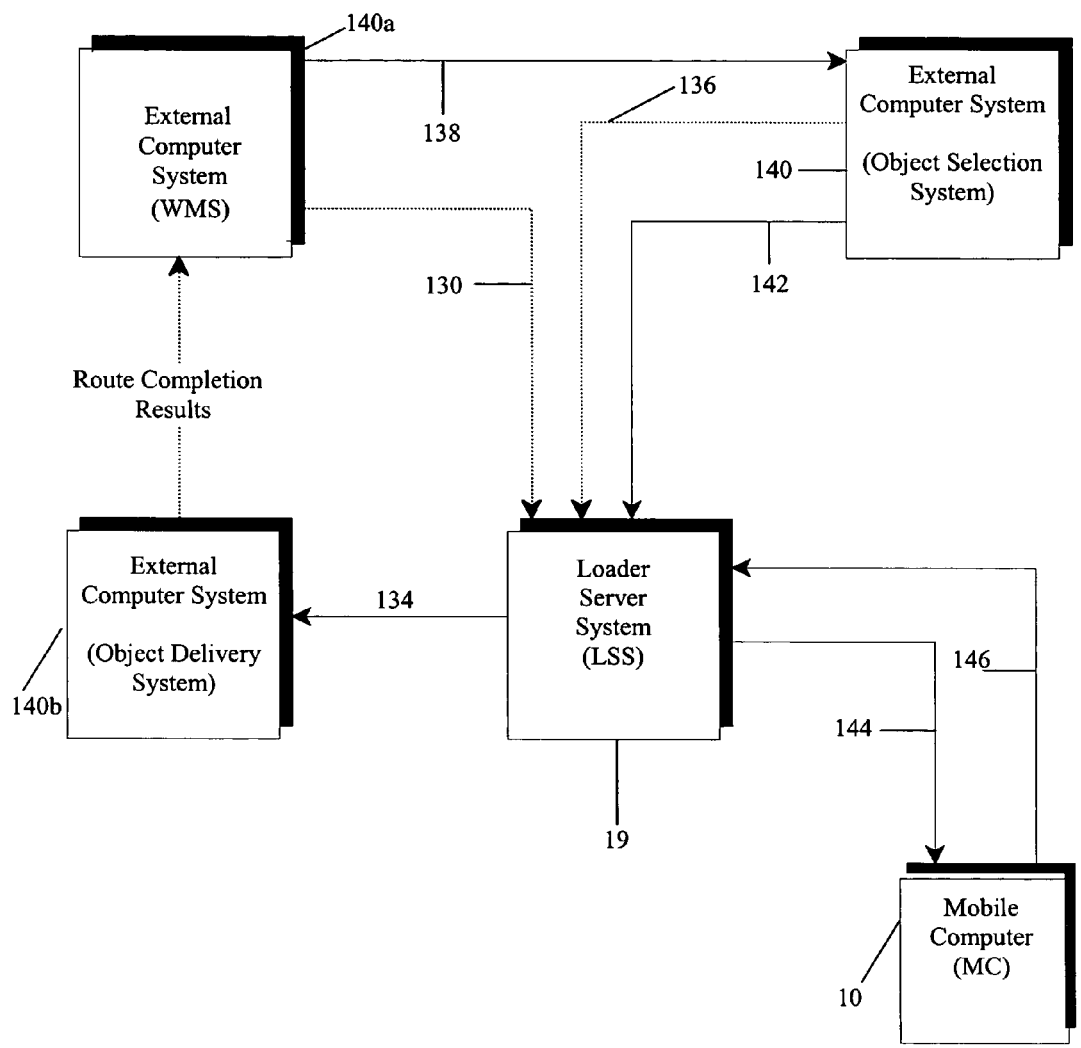
FIG. 6 is an overview of the system of the example.

As shown in FIG. 5, any time during the method, a second user can contact the first user from a remote location via the loader server system. The loader server system communicates with the mobile computer that, in turn, provides the communication via audio output device and display.

Figure 7:
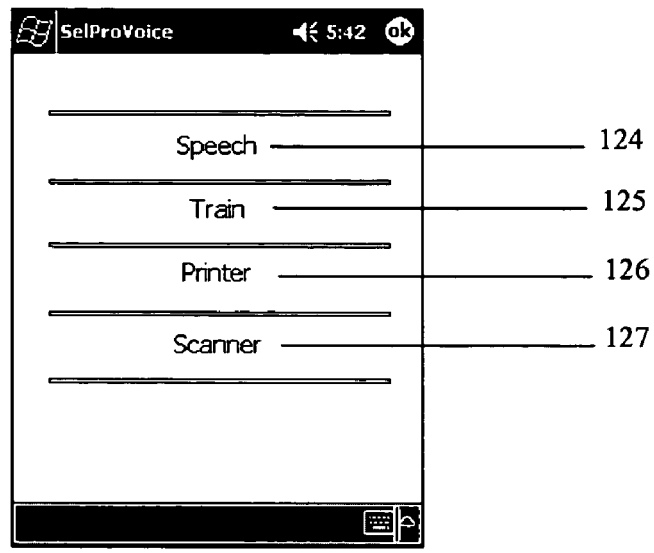
FIG. 7 is a display of the MC configuration menu.

When the MC recognizes the "display menu" command, the MC displays the system configuration menu shown in FIG. 7 and prompts the user to speak the desired menu function.

The user may say one of the following four words to select the corresponding function: "Speech" (124)—Allows the user to modify the volume, speed and pitch of the MC voice; "Train" (125)—Allows the user to retrain a particular word or phrase; "Printer" (126)—Allows the user to change label printers.

If the MC does not support a portable label printer, the MC announces, "There are no printers configured" and exits the system configuration menu; and "Scanner" (127)—Allows the user to change laser scanners. If the MC does not support a laser scanner, the MC announces, "There are no scanners configured" and exits the system configuration menu.

Note, if the user decides he does not want to perform any of the menu functions at this time, he may also say, "cancel" (or press the clear key) to exit the system configuration menu. When this is done, the MC repeats the prompt that was spoken before the user said, "display menu".

Figure 8:
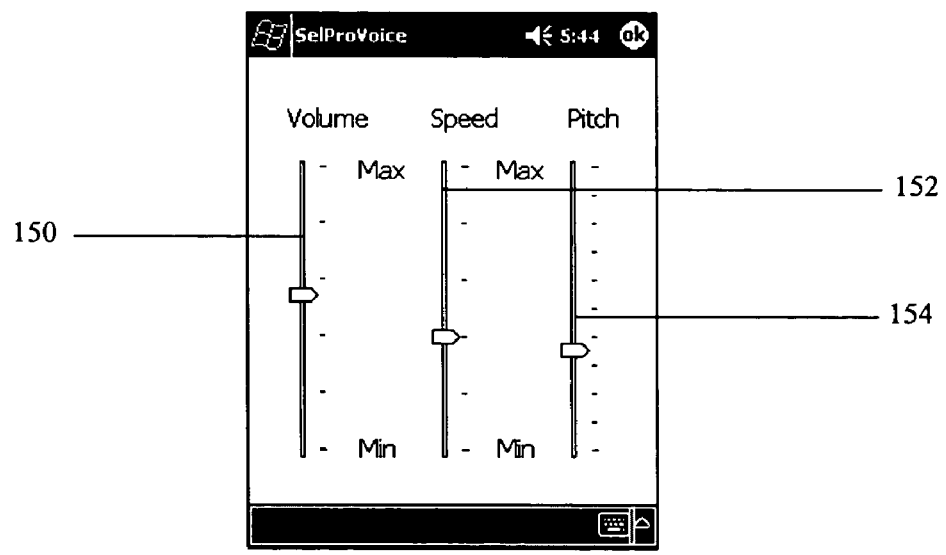
FIG. 8 is the speech configuration display.

While the system configuration menu is displayed, the loader may say "speech" in order to configure the MC voice. When the user says "speech", FIG. 8 is displayed.

The user may adjust the volume, speed and pitch by either taping the appropriate control on the screen or by speaking the appropriate control command. After a control is tapped or a control word is spoken, the MC makes the corresponding adjustment and then asks, "How is this?" using the adjusted MC voice. The user may continue to tap the controls or speak the control words until the MC voice is the way he wants it. The user should then say, "done" to indicate he has completed the MC voice adjustments. The user may also say, "cancel" to discard any adjustments made to the MC voice. Once the user has said "done" or "cancel", the MC returns to the prompt that was spoken before the user said "display menu". The following control words may be spoken in order to adjust the MC voice parameters: Volume (150)—Use the words "louder" and "softer" in order to increase or decrease the MC voice volume; Speed (152)—Use the words "faster" and "slower" in order to increase or decrease the speed of the MC voice; and Pitch (154)—Use the words "increase" and "decrease" in order to increase or decrease the MC voice pitch, see FIG. 8.

Figure 9:
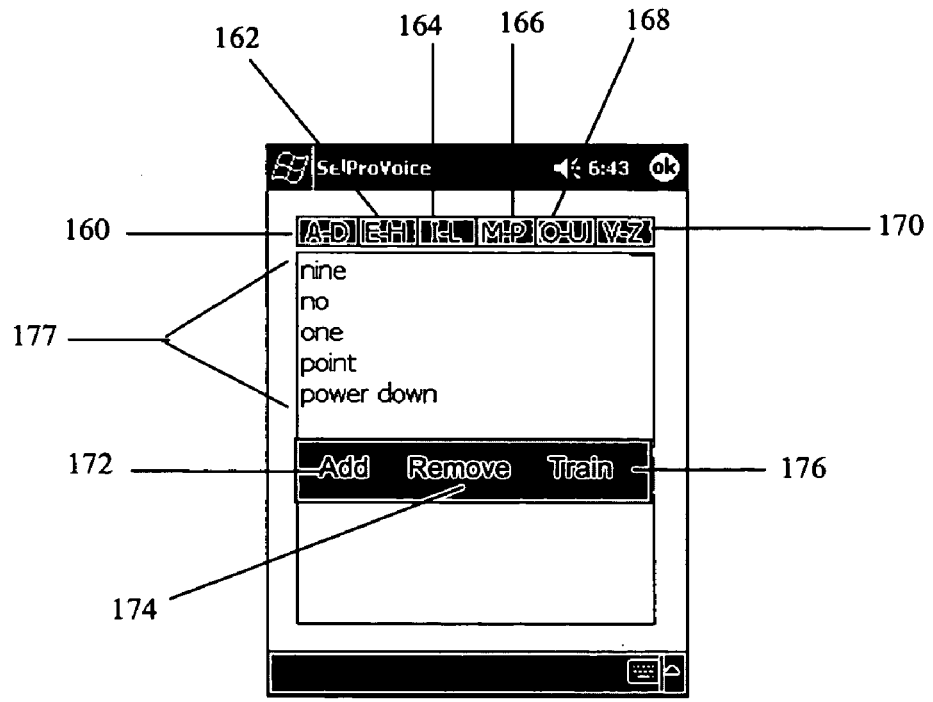
FIG. 9 is the voice recognition retraining screens.

FIG. 9 has touch points (buttons) (160, 162, 164, 166, 168 and 170) that allow the user to select groups of words based on the alphabet characters shown on the touch points. The user can select from the displayed words (177) and use the operations touch points to add (172), remove (174) or initiate training (176), for the selected word or words.

The retraining screen allows the user to select the word(s) to be retrained. Since there can be a large number of words from which to choose, the MC divides the words into small groups alphabetically. The headings at the top of the screen (e.g. A-D, E-H, etc.) indicate the group of words for that heading. The user should tap the heading in which the word to be trained would be found.

Figure 10:
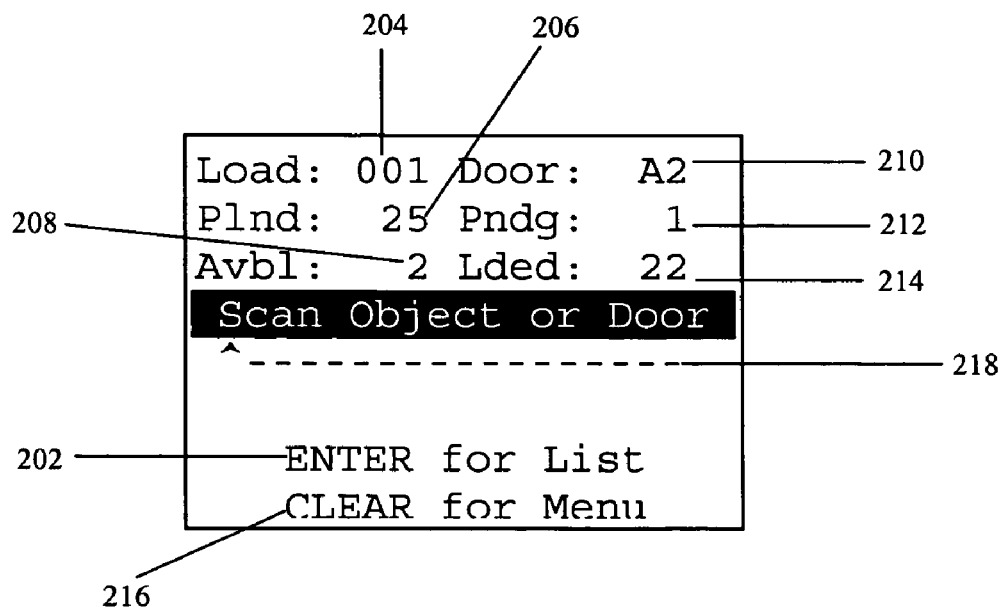
FIG. 10 is the primary loading display.

When the display shown in FIG. 10 is visible, the user normally scans the barcode (218) of the next object he or she intends to load. If the barcode of the object to be loaded cannot be scanned, the user may press the "enter" (202) key to view a list of objects which are currently available for loading for the route for which the user is currently working and may then select the desired object from the list. When an object has been selected by either of the two methods described, the object loading system determines if the object selected is valid for loading at this time.

The following information is shown in FIG. 10: the load (i.e., route) (204) and door (210) currently being worked, the total number of objects planned (206) and pending (212) ("Plnd:" and "Pndg :") for the load, and the total number of objects available (208) and loaded (214) ("Avbl:" and "Lded :") for the load.

The display shown in FIG. 10 also allows the user to initiate some other functions. These are as follows:

The user may press the enter (202) key to view and select an object from a list of objects which are currently available for loading for the route for which the user is currently working;

The user may press the clear (216) key to view the special functions menu on which a list of additional tasks which may be performed is presented; and The final other option is to scan the barcode of a warehouse door to cause the door status screen to be displayed.

Each time the user chooses the next object he or she intends to load, loader server system searches for information about the object and performs several validity checks.

Figure 11:
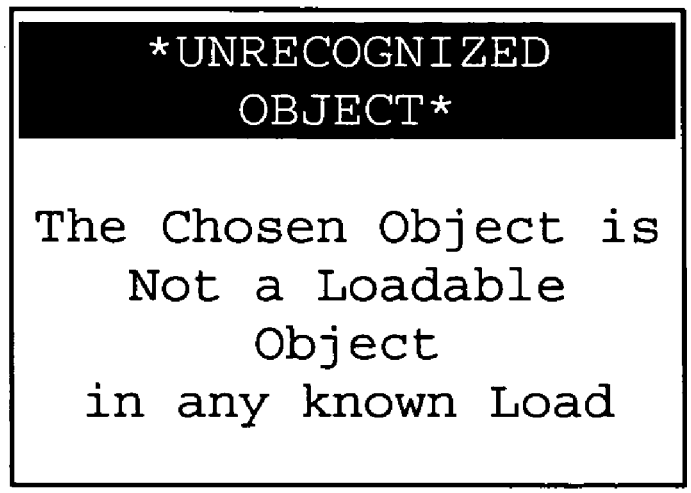
FIG. 11 is the unrecognized object display.

If a selected object is not found in any of the load plans currently defined in the LSS, the screen shown in FIG. 11 is displayed.

Figure 12:
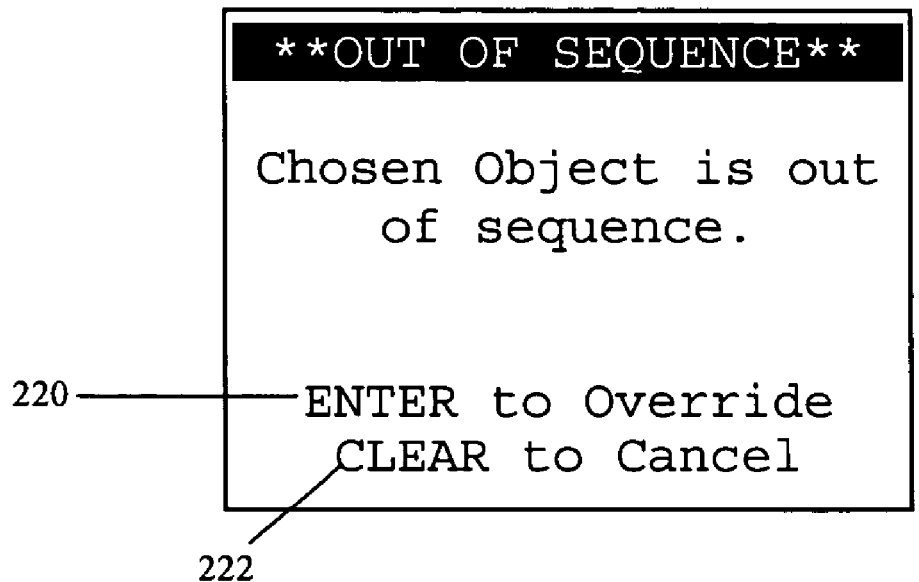
FIG. 12 is the object out of sequence display.

If an object is invalid because the object loading sequence is predetermined and the object chosen for loading is not the next one in order, the screen in FIG. 12 is displayed. If the clear (222) key is pressed, the user can select another object to load. If the enter (220) key is pressed, the load sequence is overridden (and an override notice is sent to LSS). Loading of the object continues and the user is asked to scan/enter the zone where the object is placed in the trailer (or, if zone barcode labels are not utilized, the trailer barcode).

Figure 13:
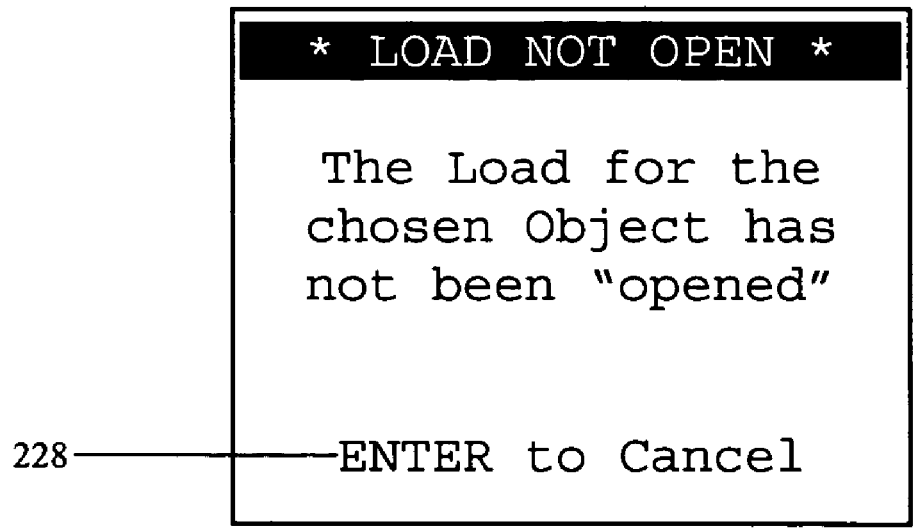
FIG. 13 is the load not open display.

If an object is invalid because the load for the chosen object has not been "opened", the screen shown in FIG. 13 is displayed. The loader should select another object to load. If the user presses enter (228), the loader is prompted to select another object for loading.

Figure 14:
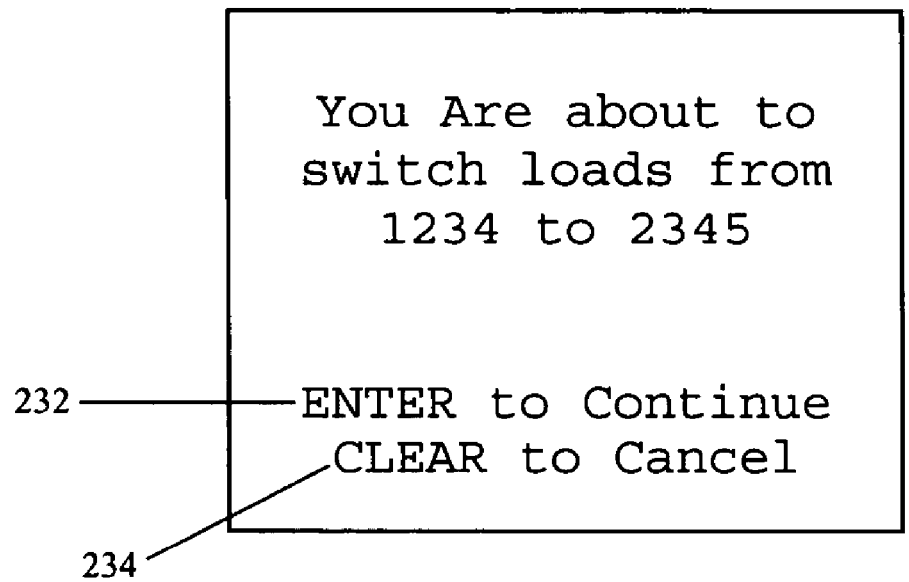
FIG. 14 is the switch loads display.

Users are notified each time they switch from one load to a different load, the MC checks to see if the object chosen for loading is for the same route as the route of the most recently loaded object. If the chosen object is not for the same route an audible signal is sounded and the screen shown in FIG. 14 is displayed. If the clear (234) key is pressed, the user can select another object to load. If the enter (232) key is pressed, loading of the object continues and the user is asked to enter the zone where the object is placed in the transport vehicle (or, if zone barcode labels are not utilized, the trailer barcode).

If an object has been manually selected (because it does not have a bar code), and if loader server system is configured to print object labels for objects whose labels are missing a screen is presented to allow the loader to re-print an appropriate container or object label.

After an object has been selected for loading and has been validated, one of several displays are presented to the loader to provide directions about where the object is to be loaded.

The display which is presented depends upon what type of object was selected (e.g., a "container", a "case" or an "equipment" object) and also upon some configuration options.

Figure 15:
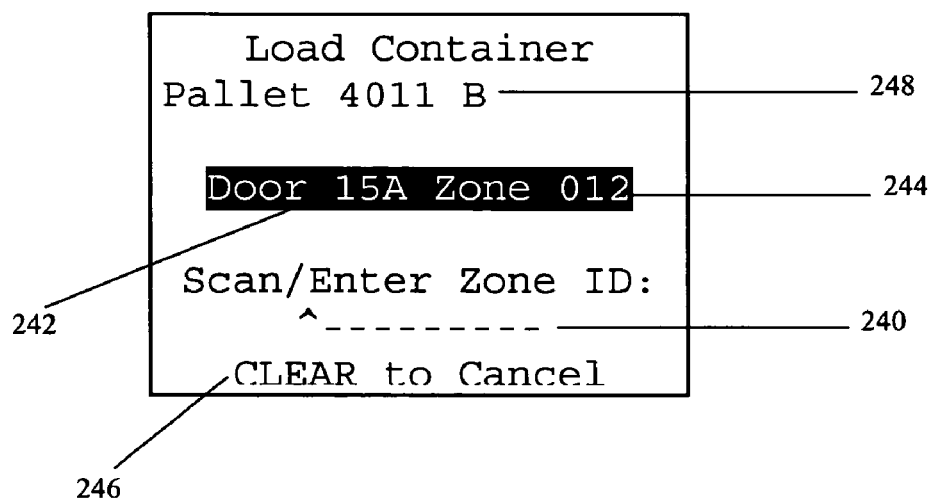
FIG. 15 is the load container display.

When a transport device (container) is selected for loading, the user is presented with the display shown in FIG. 15. The display shows the transport device ID (248), the door (242) and the zone (244) in the transport vehicle where the object is to be loaded.

The user is expected to scan the zone barcode (240) in the trailer where the container has been placed. If the zone label is missing or damaged, the loader may enter the zone ID manually by typing the trailer ID and zone number. Manually keyed positions are sent to the LSS to be saved as overrides. If the loader decides not to load this object at this time, the clear (246) key can be pressed to cancel the loading of the object.

Figure 16:
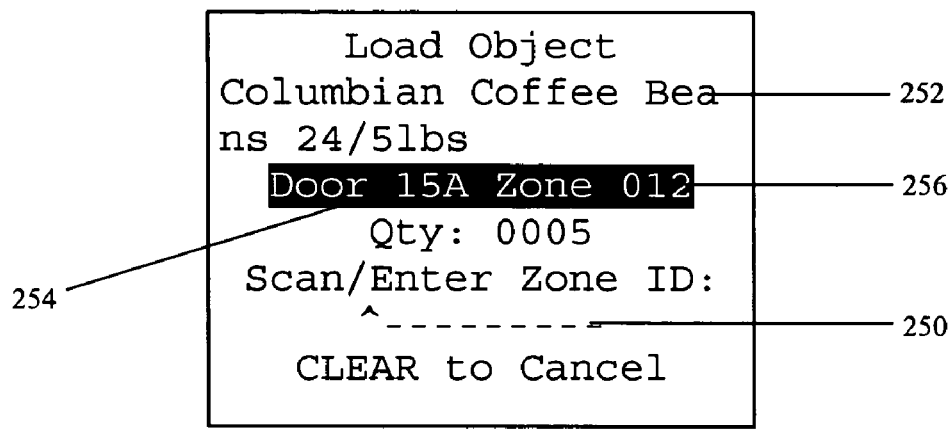
FIG. 16 is the load object display.

When an object (e.g. case) that is not part of a transport device is selected for loading, the user is presented with the screen shown in FIG. 16. The display area shows the description (252) of the object and the door (254) and zone (256) where the object is to be loaded.

The user confirms the loading position in the same way as for loading a transport device described previously. However, if the loader puts the object in or on a transport device that was previously loaded, the bar code of the transport device may be scanned rather than a zone (250) or loading position. Once the position where the object was loaded is confirmed, the loader can select another object to load or select another load to work.

Figure 17:
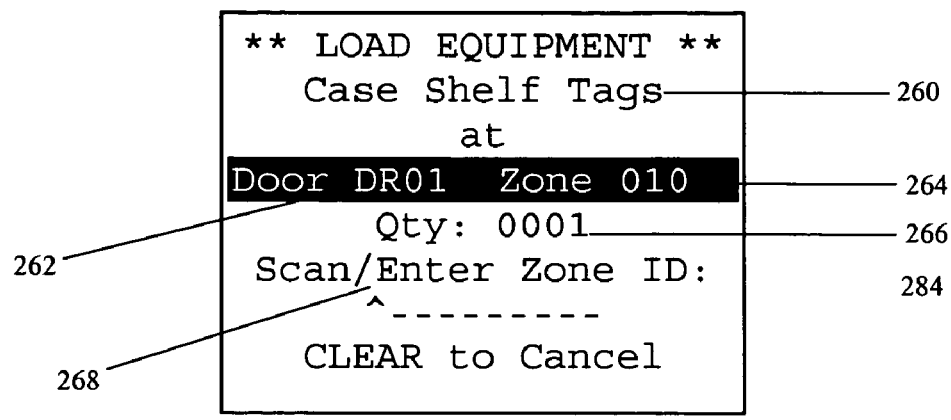
FIG. 17 is the load equipment display.

When an equipment object which was specified in the load plan is chosen, the screen shown in FIG. 17 is displayed. Again, the display shows the equipment description (260), the door (262) and transport vehicle zone (264) where the equipment is to be loaded, the quantity of equipment (266) and requests the loader scan a barcode (268) to confirm the loading.

Figure 18:
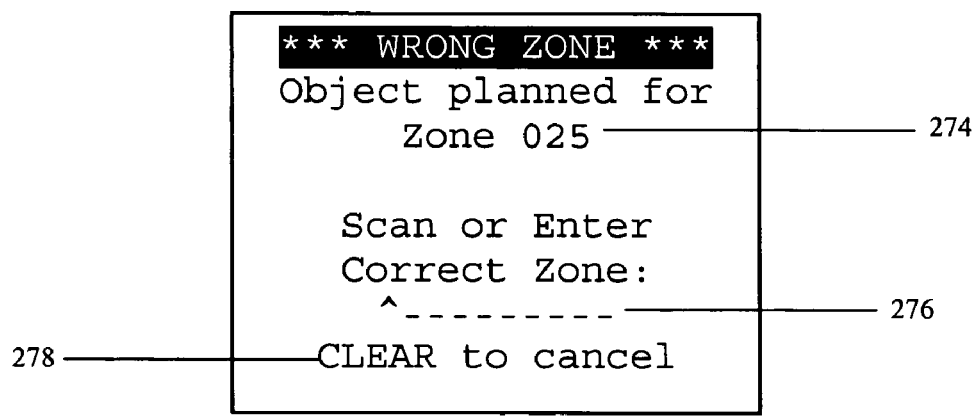
FIG. 18 is the wrong zone display.

When object trailer loading positions are predetermined and if the user scans or keys the wrong position, the screen shown in FIG. 18 is displayed.

The user should move the object to the correct zone (274) and scan that zone label (276) (or enter the zone number), or clear (278).

Figure 19:
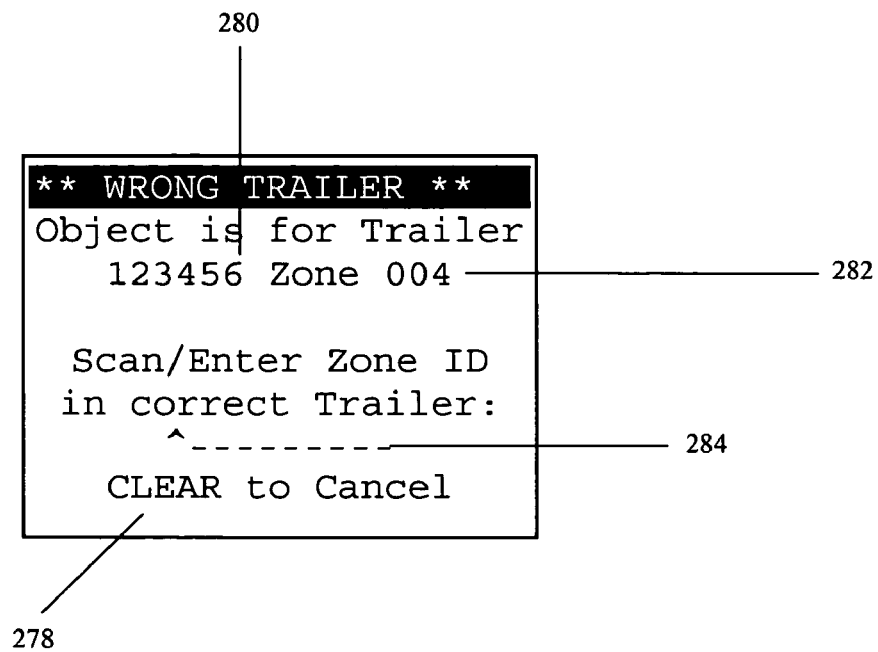
FIG. 19 is the wrong transport vehicle display.

If the user scans a trailer position barcode which does not contain the correct trailer number, the screen shown in FIG. 19 is displayed.

The user should move to the correct trailer (280), plate it in the indicated zone (282) and then scan the correct zone label (284). If the user presses the clear (278) key, he or she can select another object to load.

Figure 20:
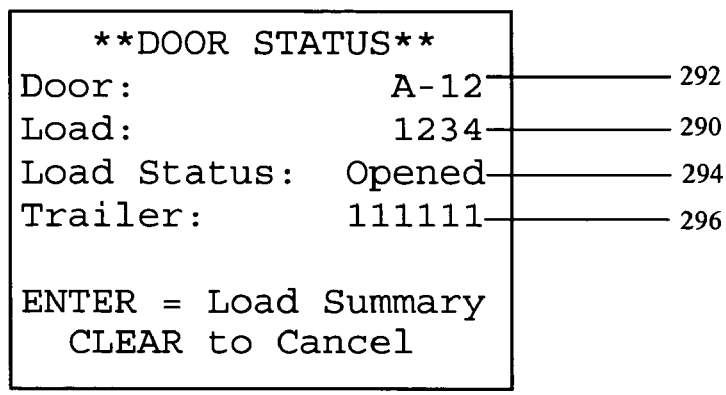
FIG. 20 is the door status display.

When this display is requested either by scanning a door barcode or by requesting it via a menu, the screen shown in FIG. 20 is displayed.

The door status screen shows load number (290) of the load being worked at the door (292) and the status of the load (294) and the transport vehicle number (296). If there is no load currently associated with the door, all of the fields except the door are blank.

The load status (294) can be one of the following: Pending—the load is "pending" until a trailer is assigned and the load is "opened" for loading; Opened—the load is being worked; Complete—all objects have been loaded; and Closed—the supervisor has closed the load; it can be dispatched.

If the clear (300) key is pressed, this display is terminated and the previous display is reactivated.

If the enter (298) key is pressed, the load summary display described elsewhere is this document is activated.

When the user (i.e., loader or supervisor) requests the load summary display, the screen shown in FIG. 21 is displayed.

The information presented on this display includes the following: the load (i.e., route) number (310), the status (312), the number of objects to be loaded (314), the number of objects which have not been loaded and are not yet "available" to be loaded (316), the number of objects currently "available" to be loaded (318), the number of objects left off the load (320), and the number of objects currently loaded (322), Pressing the enter (324) key returns to the previous display.

There may be several times when a Loader needs to see a list of objects which have not been loaded (they are available) and to select an object from the list. The screen shown in FIG. 22 is displayed to allow the user to confirm the load (354) for which objects are to be listed, or to specify a different load (350).

Pressing clear (352) returns to the previous display.

Figure 23:
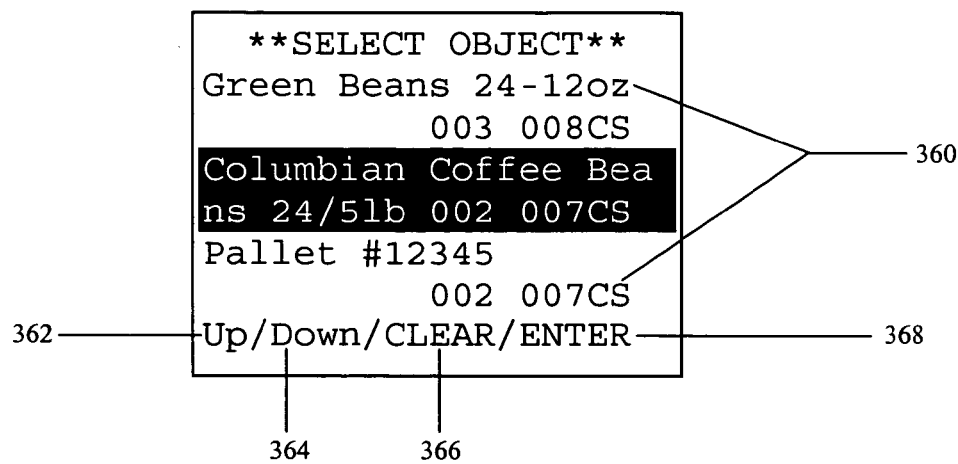
FIG. 23 is a select object display.

Once a valid load ID is known, the screen shown in FIG. 23 will be displayed listing the objects which are available for loading for that specific load (360).

The up (362) and down (364) keys can be used to scroll the list. Pressing clear (366) returns to the previous display.

Figure 24:
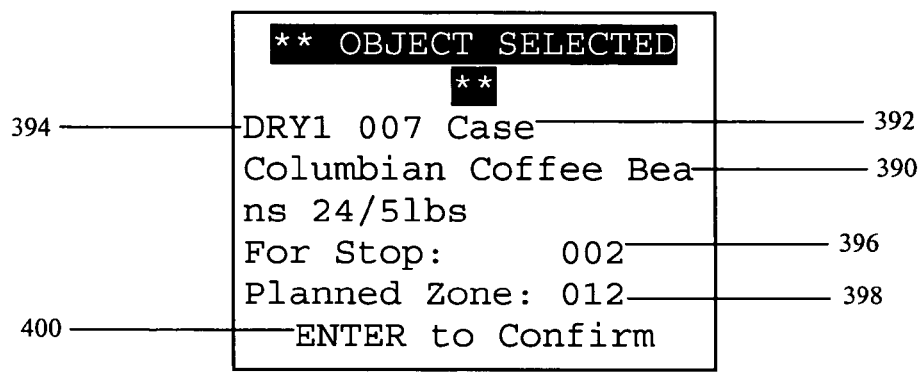
FIG. 24 is an object selected display.

When the enter key (368) is pressed, the screen shown in FIG. 24 is displayed showing the selected object. The display shows the description of the selected object (390), the type of object (392), the warehouse area (394), location (stop) at which object will be delivered (396) and the zone (398) where the object is loaded or to be loaded.

Pressing enter (400) confirms the choice and causes this function to be terminated and the function which initiated this function to be resumed.

While the invention has been described with emphasis on the preferred embodiments, it should be understood that within the scope of the appended claims, the invention might be practiced other than a specifically described herein.

What is claimed is:

1. A method for loading object on a transport vehicle comprising:
   a. using a mobile computer usable with a transport vehicle having a bar code reader, a display, an audio output device, an audio input device, a tactile input device, text-to-speech software, a voice recognition software, loader applications software, a printer and radio frequency identification (RFID) reader wherein the mobile computer is adapted for communication between an loader server system and a user and the loader server system is adapted for communication between the mobile computer and at least one external computer system;
   b. entering a user code to log onto the mobile computer;
   c. training the voice recognition software by the user to recognize any number of unique commands using the language;
   d. providing instructions to the user from the loader applications software using the text-to-speech software to the audio output device and providing information from the loader applications software to the display;
   e. transmitting a request from the mobile computer to the loader server system to obtain a list of objects to be loaded;
   f. using the applications software to generate a summary of the objects to be loaded from the list;
   g. displaying the summary of the objects to be loaded on the display;

h. providing the summary of the objects to be loaded using via the text-to-speech software to the audio output device;
i. performing a step which is a member of the group: acknowledging the summary of objects to be loaded by the user using the tactile input device and acknowledging the summary of objects to be loaded using the audio input device;
j. identifying an object to determine if the object is to be loaded by a step selected from the group consisting of:
 i. speaking the characters identifying the object into the audio input device;
 ii. scanning a barcode on the object;
 iii. reading a RFID data on the object;
k. advising the user with the text-to-speech software to the audio output device of a member of the group consisting of:
 i. the object can be loaded;
 ii. the object is not loadable;
 iii. the object is out of sequence for the load;
 iv. the object is for a different load;
l. acknowledging the object has been loaded using a method selected from the group:
 i. providing an acknowledgement using the voice recognition software;
 ii. bar code scanning a transport vehicle;
 iii. bar code scanning the location of the transport vehicle;
 iv. reading an RFID tag for a transport vehicle; and
 v. reading an RFID tag for the location of the transport vehicle;
m. repeating steps (j) through (l) until all objects have been loaded;
n. providing an acknowledgement to the loader server system the results of the process steps (b) through (m); and
o. transferring the results from the loader server system to the at least one external computer system.

2. The method of claim 1, wherein the acknowledgement word is "ready".

3. The method of claim 1, further comprising the step of using the mobile computer to obtain status information for the user that is an indication of the user's performances compared to the expected completion time for steps (b) through (m).

4. The method of claim 1, wherein answers to a series of safety questions are required from the user regarding the transport vehicle into which the objects are being loaded from the group comprising:
 i. are the brakes working?;
 ii. is the horn working?;
 iii. is the steering working?;
 iv. are there any leaks in the transport vehicle?;
 v. is there any damage to the transport vehicle?;
 vi. are the tires and wheels inflated and undamaged?; and
 vii. combinations thereof.

5. The method of claim 1, wherein at any time during the method, a second user can contact the user from a remote location via the loader server system, which communicates with the mobile computer which then provides the communication via audio output device and display.

6. The method of claim 1, wherein the object comprises a transport device containing product.

7. The method of claim 1, wherein the object comprises product.

8. The method of claim 1, wherein the object comprises a piece of equipment.

9. The method of claim 1, further comprising the step of alerting the user of the object missing product prior to loading.

* * * * *